United States Patent
Osterberg et al.

[11] Patent Number: 6,129,185
[45] Date of Patent: Oct. 10, 2000

[54] MAGNETICALLY DESTIFFENED VISCOUS FLUID DAMPER

[75] Inventors: David A. Osterberg, Glendale; Gerald K. Foshage, Peoria, both of Ariz.

[73] Assignee: Honeywell International Inc., Morristown, N.J.

[21] Appl. No.: 09/000,678

[22] Filed: Dec. 30, 1997

[51] Int. Cl.$^7$ ..................................... F16F 9/53
[52] U.S. Cl. .................. 188/267.2; 267/140.14; 267/122
[58] Field of Search .................. 188/267.2, 267, 188/267.1, 298, 322.5, 378–380, 317, 282.3, 312, 314; 267/122, 140.14, 140.15, 221, 226, 136; 192/21.5, 84.31, 84.3; 60/326; 248/550; 180/300, 312, 902

[56] References Cited

U.S. PATENT DOCUMENTS

| | | |
|---|---|---|
| 2,661,596 | 12/1953 | Winslow . |
| 3,059,915 | 10/1962 | Kemelhor .............................. 188/267.2 |
| 4,710,656 | 12/1987 | Studer . |
| 4,760,996 | 8/1988 | Davis . |
| 4,848,525 | 7/1989 | Kent et al. . |
| 5,029,677 | 7/1991 | Mitsui ..................... 188/378 |
| 5,219,051 | 6/1993 | Davis . |
| 5,249,783 | 10/1993 | Davis . |
| 5,277,281 | 1/1994 | Carlson et al. ...................... 188/267.2 |
| 5,284,330 | 2/1994 | Carlson et al. ...................... 188/267.2 |
| 5,305,981 | 4/1994 | Cunningham et al. . |
| 5,318,156 | 6/1994 | Davis . |
| 5,366,048 | 11/1994 | Watanabe et al. ................. 267/140.14 |
| 5,435,531 | 7/1995 | Smith et al. ....................... 267/140.14 |
| 5,492,312 | 2/1996 | Carlson ................................. 188/267.2 |
| 5,632,361 | 5/1997 | Wulff et al. ........................ 267/140.14 |
| 5,788,029 | 8/1998 | Smith et al. ............................ 188/267 |
| 5,979,882 | 11/1999 | Osterberg ................................. 267/122 |

FOREIGN PATENT DOCUMENTS

| | | | |
|---|---|---|---|
| 63-210432 | 9/1988 | Japan ................................. 188/267.2 |
| 552235 | 3/1993 | Japan ................................. 188/267.2 |

Primary Examiner—Douglas C. Butler
Attorney, Agent, or Firm—Charles J. Ungemach

[57] ABSTRACT

Disclosed is a vibration damping and isolation apparatus having a passive damping mechanism. The passive damping mechanism includes a piston and first and second elements of magnetic material with a shaft extending therebetween. The piston and shaft are linearly movable relative to one another upon application of forces to the damping apparatus. The shaft is spaced from an axial bore of the piston by a restrictive fluid flow annulus that is filled with a viscous fluid. A resilient seal mechanism, having a static stiffness, couples the first and second elements to the piston to define first and second viscous fluid filled chambers in fluid communication with the annulus. Shearing of the fluid as it is displaced through the annulus dissipates the forces. A magnetic mechanism generates magnetic forces that act on the first and second elements to destiffen the static stiffness of the resilient seal mechanism to improve vibration damping and isolation at low frequencies.

21 Claims, 2 Drawing Sheets

MAGNETICALLY DESTIFFENED VISCOUS FLUID DAMPER

BACKGROUND OF THE INVENTION

This invention relates to the field of vibration damping and isolation. In particular, the present invention is a damping and isolation system that uses magnetics to cancel the majority of the static stiffness of a viscous fluid, vibration damping and isolation system.

A precision payload, such as a telescope, is susceptible to vehicle disturbances that produce line-of-sight jitter and reduce the optical performance. These disturbances may come from devices such as the reaction wheel assemblies used to point the vehicle. Therefore, an efficient means of damping and isolating, in a controlled manner, either the payload or disturbance source is of considerable importance.

Typically, to minimize performance degradation caused by vibrations, a passive damping and isolation system (otherwise known as a "fluid damper") has been used for damping and isolating the load carried by a precision isolation system. Present passive fluid dampers operate by displacing a viscous fluid from one fluid reservoir to another fluid reservoir through a restrictive passage. Shearing of the viscous fluid as it flows through the restrictive passage provides a damping force that is proportional to velocity.

To function properly, one of the fluid reservoirs must be pressurized with respect to the other fluid reservoir to force the viscous fluid to flow from one reservoir to the other through the restrictive passage. This pressurization must be contained by the fluid damper structure for the fluid damper to operate consistently over its useful life. To prevent leakage of the viscous fluid, hermetic seals, such as bellows, are used. Since the structure of the bellows must be robust enough withstand internal fluid pressures and buckling, the bellows add static stiffness to the damping and isolation system. Though this static stiffness is important to the structural integrity of the damping and isolation system, the static stiffness affects the overall performance of the vibration damper. In particular, while passive fluid dampers provide exceptional vibration damping and isolation at high frequencies (i.e., above the square root of two times resonant frequency) passive dampers amplify disturbances at low frequencies. This amplification of disturbances at low frequencies is due primarily to the static stiffness requirements of the bellows (i.e., flexure components) of the passive fluid dampers. In a three parameter system the amplification can be reduced by increasing the ratio of volumetric stiffness (Kb) to static stiffness (Ka).

There is a need for improved damping and isolation systems. In particular, there is a need for a damping and isolation system that will cancel the majority of the static stiffness of flexure components within the damping and isolation system. In addition, the damping and isolation system should allow more freedom of design of the flexure components, while providing acceptable levels of vibration damping and isolation. The damping and isolation system should provide these features while maintaining a weight, size and complexity efficient structure.

SUMMARY OF THE INVENTION

The present invention is a structural apparatus. The structural apparatus includes a passive damping mechanism having first and second elements of magnetic material with a shaft extending therebetween. A piston having an axial bore is coaxially positioned with respect to the shaft. The piston and shaft are linearly movable relative to one another upon application of forces to the structural apparatus. The shaft is spaced from the axial bore of the piston by a restrictive fluid flow annulus. A resilient seal mechanism, having a static stiffness, couples each of the first and second elements to the piston to define first and second fluid chambers in fluid communication with the restrictive fluid flow annulus. A viscous fluid fills the first and second chambers and the annulus. The viscous fluid dissipates the forces via shearing of the fluid as the fluid is displaced through the annulus upon relative linear movement of the piston and shaft. A magnetic mechanism generates magnetic forces which act on the first and second elements to destiffen the static stiffness of the resilient seal mechanism.

This structural apparatus significantly improves the vibration damping and isolation characteristics of the passive damping mechanism at low frequencies. Low frequency vibration damping and isolation has been improved since the magnetic forces generated by the magnetic mechanism exhibit a negative stiffness that cancels a majority of the positive stiffness of flexure components of the resilient seal mechanism. In addition, the passive damping mechanism of the structural apparatus permits greater freedom of design of the flexure components, since the destiffening effect of the magnetic mechanism allows the use of more robust flexure component designs while achieving the same or reduced flexure component static stiffness. Moreover, the structural apparatus having a passive damping mechanism can deliver improved vibration damping and isolation while maintaining a weight, size and complexity efficient structure.

DETAILED DESCRIPTION OF THE PREFERRED EMBODIMENTS

Figure 1:
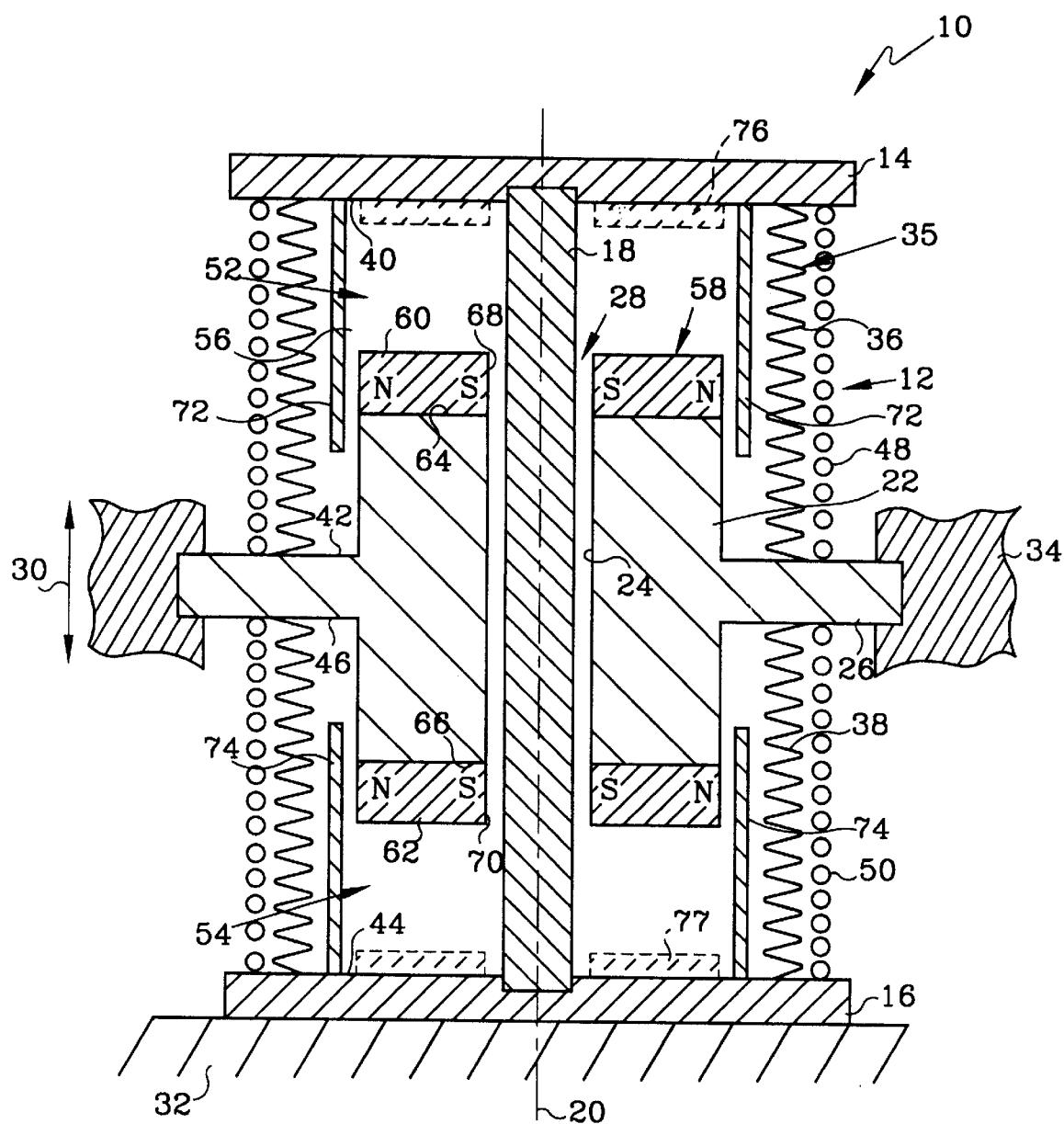
FIG. 1 is a side sectional view of a vibration damping and isolation apparatus in accordance with the present invention.

A structural apparatus or strut, such as a vibration damping and isolation apparatus 10 in accordance with the present invention is illustrated in FIG. 1. The damping and isolation apparatus 10 includes a passive damping mechanism 12 having a round end piece 14 connected to and spaced from a round base piece 16 by a rigid shaft 18. The end and base pieces 14 and 16 and the rigid shaft 18 are all centered on a longitudinal axis 20 of the damping and isolation apparatus 10. The damping mechanism 12 further includes a piston 22 having an axial bore 24 and a radially extending mounting flange 26. The axial bore 24 of the piston 22 is coaxially positioned with respect to the shaft 18 (and longitudinal axis 20) to create a radial gap, known as a restrictive fluid flow annulus 28, therebetween. The annulus 28 allows the piston 22 and shaft 18 to be linearly movable (as represented by double headed arrow 30) relative to one another along the longitudinal axis 20. This relative linear movement of the piston 22 and shaft 18 occurs upon application of forces, such as vibration and shock forces to the damping and isolation apparatus 10. The radial flange 26 of the piston 22 and the base piece 16 permit adaptation of the damping and isolation apparatus 10 to a structure, such as a sensitive payload. Typically, the base piece 16 is secured to ground 32 while the radial flange 26 of the piston 22 is secured to a payload 34 or like structure.

The passive damping mechanism 12 of the damping and isolation apparatus 10 further includes resilient seal mechanism 35 defined by first and second resilient fluid seal bellows 36 and 38 for coupling the end and base pieces 14 and 16 to the piston 22. The first resilient fluid seal bellows 36 forms a hermetic seal between a lower surface 40 of the end piece 14 and an upper surface 42 of the radial flange 26 of the piston 22. The second resilient fluid seal bellows 38 forms a hermetic seal between an upper surface 44 of the base piece 16 and a lower surface 46 of the radial flange 26 of the piston 22. The resiliency of the first and second bellows 36 and 38 permits relative linear movement of the piston 22 and shaft 18, and the resiliency acts to center (this position being illustrated in FIG. 1) the piston 22 with respect to the end and base pieces 14 and 16. In addition, the first and second bellows 36 and 38 add positive, axial static stiffness and volumetric stiffness (Kb) to the passive damping mechanism 12 of the damping and isolation apparatus 10. The bellows 36 and 38 are selected to provide the proper volumetric stiffness (Kb), pressure and stroke capability; the static stiffness is not considered since it will be adjusted through the addition of positive mechanical and/or negative magnetic springs to provide the proper overall static stiffness (Ka). An optional first spring 48 mounted between the lower surface 40 of the end piece 14 and the upper surface 42 of the radial flange 26, and an optional second spring 50 mounted between the lower surface 46 of the radial flange 26 and the upper surface 44 of the base piece 16 may be added to the passive damping mechanism 12 to increase the positive axial stiffness and centering force created by the bellows 36 and 38, if desired. The first and second bellows 36 and 38 define first and second fluid chambers 52 and 54 to either side and in fluid communication with the restrictive fluid flow annulus 28.

A suitable, substantially incompressible viscous fluid 56 is installed in the passive damping mechanism 12 to completely fill the first and second fluid chambers 52 and 54 and the restrictive annulus 28. This viscous fluid 56, upon application of vibration and shock forces to the damping and isolation apparatus 10, is forced (i.e., displaced) between the first fluid chamber 52 and the second fluid chamber 54, due to relative linear movement of the piston 22 and shaft 18, via the restrictive annulus 28. The viscous fluid 56 dissipates the vibration and shock forces via shearing of the viscous fluid 56 as the fluid 56 is displaced through the restrictive annulus 28. Though the volume of the first and second fluid chambers 52 and 54 may change with the motion of the payload 34 attached to the radial flange 26 of the piston 22, the total viscous fluid volume remains constant due to the fixed distance maintained by the shaft 18 between the end and base pieces 14 and 16. Consequently, linear movement of the piston 22 relative to the shaft 18 must produce equal but opposite volume changes in the first and second fluid chambers 52 and 54.

As seen in FIG. 1, the passive damping mechanism 12 of the damping and isolation apparatus 10 further includes a passive magnetic mechanism 58 for generating magnetic forces which act on the end and base pieces 14 and 16 to destiffen the positive, axial static stiffness of the bellows 36 and 38 and, if used, the added positive, axial static stiffness of the first and second springs 48 and 50. The magnetic mechanism 58 includes first and second, toroidal shaped permanent magnets 60 and 62, respectively. The first permanent magnet 60 is mounted on an upper side 64 of the piston 22 proximate to the end piece 14, and the second magnet 62 is mounted on a lower side 66 of the piston 22 proximate to the base piece 16. Central bores 68 and 70 of the first and second permanent magnets 60 and 62, respectively, are coaxially positioned with respect to the shaft 18 and the longitudinal axis 20. In one preferred embodiment, the end and base pieces 14 and 16 are manufactured of a magnetic material, such as iron, while the shaft 18, piston 22 and bellows 36 and 38 are manufactured of a non-magnetic material, such as aluminum.

In operation, the magnetic forces generated by the first and second permanent magnets 60 and 62 exhibit a net negative axial stiffness that is designed to passively cancel a majority (i.e., substantially 90%) of the positive, axial static stiffness of the bellows 36 and 38 and, if used, the added positive, axial static stiffness of the first and second springs 48 and 50. The remaining positive stiffness (i.e., approximately 10%) allows stable operation (i.e., dissipation of the vibration and shock forces) of the passive damping mechanism 12. Though the "magnetic spring" provided by the first and second permanent magnets 60 and 62 is not entirely linear (a "mechanical spring" such as provided by the bellows 36 and 38 and, if used the springs 48 and 50, being substantially linear) the passive damping mechanism 12 includes first and second stops 72 and 74 to keep the relative linear displacement of the piston 22 and the shaft 18 within the linear range of the "magnetic spring" defined by the first and second permanent magnets 60 and 62. The first and second stops 72 and 74 extend from the end and base pieces 14 and 16, respectively, toward the flange 26 of the piston 22, and contact the flange 26 to limit the linear displacement of the piston 22 and the shaft 18. If a greater range of linear displacement of the piston 22 and shaft 18 is necessary, then the "mechanical spring" defined by the bellows 36 and 38 and, if used the springs 48 and 50 can be designed to be slightly non-linear to linearize the passive damping mechanism 12. In other words, non-linear positive "mechanical springs" can be designed that can cancel the non-linearness of nonlinear negative "magnetic springs".

Though the "magnetic spring" provided by the magnetic forces generated by the first and second permanent magnets 60 and 62 has a negative stiffness along the longitudinal axis 20, the magnetic forces of magnets 60 and 62 exhibit a positive stiffness in the radial direction. This radial stiffness acts as a force to coaxially center the piston 22, and therewith the axial bore 24, on the shaft 18 to thereby maintain radial gap defining the restrictive fluid flow annulus 28. The radial stiffness provided by the magnets 60 and 62 can be controlled by the design (i.e., shape) of the end and base pieces 14 and 16. By configuring the end and base pieces 14 and 16 as flat plates, radial stiffness can be minimized. If additional radial stiffness is necessary, the end and base pieces 14 and 16 can include toroidal shaped protrusions 76 and 77 (shown in dashed lines), respectively, that extend toward and are axially aligned with the magnets 60 and 62. Radial stiffness is increased since the magnetic flux between the end and base pieces 14 and 16 and the magnets 60 and 62 acts through the shortest path. Increased radial stiffness has advantages in that it increases the force coaxially centering the piston 22, and therewith the axial bore 24, on the shaft 18 to thereby maintain radial gap defining the restrictive fluid flow annulus 28.

Figure 2:
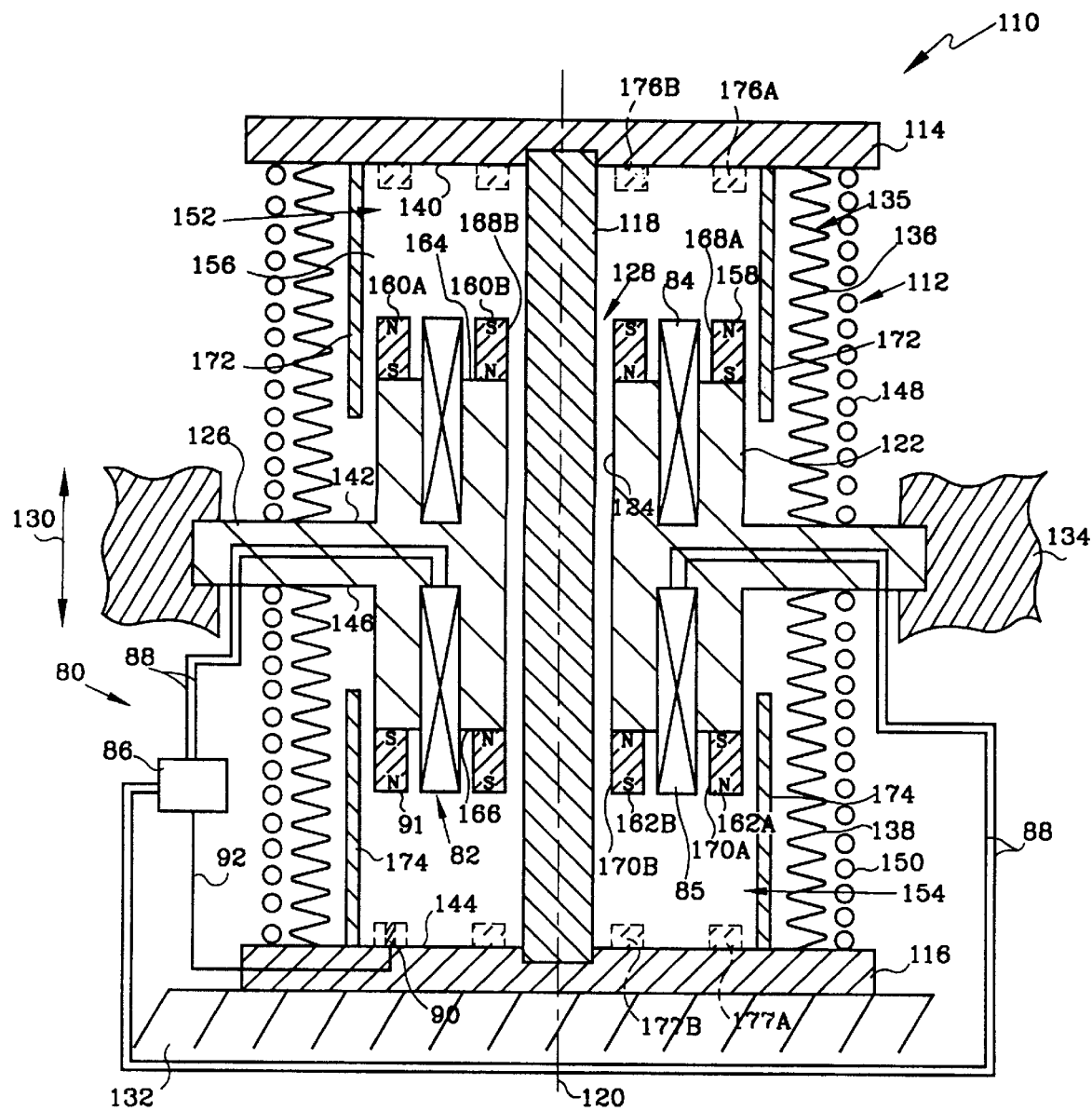
FIG. 2 is a side sectional view of an alternative embodiment of a vibration damping and isolation apparatus in accordance with the present invention.

FIG. 2, illustrates an alternative vibration damping and isolation apparatus 110. Like parts are labeled with like numerals except for the addition of the prescript 1. In the alternative damping and isolation apparatus 110, the passive magnetic mechanism 158 includes spaced first and second, toroidal shaped permanent magnets 160A and 160B, and spaced third and fourth, toroidal shaped permanent magnets 162A and 162B. The spaced first and second permanent magnets 160A and 160B are mounted on the upper side 164 of the piston 122 proximate to the end piece 114, and the spaced third and fourth permanent magnets 162A and 162B are mounted on a lower side 166 of the piston 122 proximate to the base piece 116. Central bores 168A,B and 170A,B of the permanent magnets 160A,B and 162A,B, respectively, are coaxially positioned with respect to the shaft 118 and the longitudinal axis 120. In addition, to increase the radial stiffness and coaxial centering force provided by the permanent magnets 160A,B and 162A,B of the alternative damping and isolation apparatus 110, the end and base pieces 114 and 116 can include pairs of toroidal shaped protrusions 176A,B and 177A,B (shown in dashed lines), respectively, that extend toward and are axially aligned with the magnets 160A,B and 162A,B. The magnets 160A,B and 162A,B and protrusions 176A,B and 177A,B of the damping and isolation apparatus 110 function identical to the magnets 60 and 62 and protrusions 76 and 77 of the previous embodiment of the damping and isolation apparatus 10.

The significant difference between the alternative damping and isolation apparatus 110 and the previously described damping and isolation apparatus 10 is the addition of an active enhancement mechanism 80 to further destiffen the positive, axial static stiffness of the bellows 136 and 138 and, if used, the added positive, axial static stiffness of the first and second springs 148 and 150. The active enhancement mechanism 80 includes an auxiliary active magnetic mechanism 82 defined by toroidal shaped, first and second magnetic coils 84 and 85, respectively. The first magnetic coil 84 is mounted on the upper side 164 of the piston 122 in the space between the permanent magnets 160A and 160B and proximate to the end piece 114. The second magnetic coil 85 is mounted on the lower side 166 of the piston 122 in the space between the permanent magnets 162A and 162B and proximate to the base piece 116.

Power, such as direct current (DC), for energizing the first and second magnetic coils 84 and 85 is provided by a power source 86 through leads 88. Upon energization in the common mode, the first and second magnetic coils 84 and 85 both generate additional magnetic forces (exhibiting a negative axial stiffness) that actively further destiffens (i.e., further cancels), beyond the passive destiffening provided by the permanent magnets 160A,B and 162A,B, the positive, axial static stiffness of the bellows 136 and 138 and, if used, the positive, axial static stiffness of the springs 148 and 150. The permanent magnets 160A,B and 162A,B, even though smaller in size when compared to the magnets 60 and 62, still passively cancel a majority (i.e., substantially 60%) of the positive, axial static stiffness of the bellows 136 and 138 and, if used, the positive, axial static stiffness of the springs 148 and 150. The additional active destiffening provided by the auxiliary active magnetic mechanism 82 can be varied (i.e., depending upon whether the power source 86 is energized or not and the voltage variably delivered by the power source 86 when energized) in magnitude within the range of 0% to 30%. The remaining positive stiffness (i.e., approximately 10% to 40%) allows stable operation (i.e., dissipation of the vibration and shock forces) of the passive damping mechanism 112. This has the advantage of allowing the adjustment of the destiffening force after the positive mechanical stiffness has been determined. Likewise the active enhancement mechanism 80 can also be energized to oppose or buck the magnetic forces of the permanent magnets 160A,B and 162A,B, to actively increase the positive stiffness, allowing the break frequency of the isolation apparatus 110 to be increased as well as decreased.

Power can also be applied differentially to coils 84 and 85, increasing the magnetic force in one direction and decreasing it in the other to produce a net force on the payload 134.

This allows active damping and positioning of the payload 134 as described in U.S. patent application Ser. No. 08/811, 562 entitled "Hybrid Isolator And Structural Control Actuator Strut" assigned to the same assignee and which is incorporated herein by reference thereto.

A position sensing mechanism 90 is coupled to the power source 86 via lead 92. The sensing mechanism 90 continuously senses the axial position of the passive damping mechanism 112 and communicates this data to the power source 86. The power source 86 then energizes and/or varies the current delivered to the magnetic coils 84 and 85, so as to modify the magnetic destiffening forces slightly as needed to better linearize the system. This active modification of passive magnetic destiffening forces allows the damping and isolation apparatus 110 to be further destiffened (i.e. <10%) while still maintaining stability of the system. In the case of a power failure affecting the power source 86, and therewith operation of the auxiliary active magnetic mechanism 82, the passive damping mechanism 112 and the magnetic mechanism 158 remains operative.

In a preferred embodiment, the sensing mechanism 90 is a position or flux sensor positioned between the base piece 116 and a magnet face 91 of permanent magnet 162A. The position sensor 90 senses changes in axial position (or the change of flux in the magnetic gap) due to vibration and shock forces, acting on the damping and isolation apparatus 110.

The vibration damping and isolation apparatus 10, 110 significantly improves the vibration damping and isolation characteristics of the passive damping mechanism 12, 112 at low frequencies. Low frequency vibration damping and isolation has been improved since the magnetic forces generated by the passive magnetic mechanism 58, 158 and the auxiliary active magnetic mechanism 82 exhibit a negative stiffness that cancels a majority of the positive stiffness of the bellows 36, 38, 136 and 138 and, if used, the springs 48, 50, 148 and 150. In addition, the passive damping mechanism of the structural apparatus permits greater freedom of design of the bellows 36, 38, 136 and 138, since the destiffening effect of the magnetic mechanisms 58, 158 and 82 allows the use of more robust bellows designs while achieving the same or static stiffness. Moreover, the vibration damping and isolation apparatus 10, 110 can deliver improved vibration damping and isolation while maintaining a weight, size and complexity efficient structure.

Present art allows the static stiffness (Ka) to be increased independent of the volumetric stiffness (Kb) through the addition of a spring in parallel with the resilient seal. Present art also allows the volumetric stiffness (Kb) to be decreased without changing the static stiffness (Ka) through the addition of parallel bellows. However the addition of a negative stiffness magnetic element allows the static stiffness to be decreased without changing the volumetric stiffness (Kb), allowing designs with Ka/Kb ratio's previously unobtainable.

Careful design of the geometry of the magnetic material near the gaps can be used to produce increased radial stiffness relative to axial stiffness which were previously unobtainable. This is important since very soft axial flexures or bellows are also very soft radially. Radial stiffness must be maintained to prevent misalignments or rubbing in the device.

Although the present invention has been described with reference to preferred embodiments, workers skilled in the art will recognize that changes may be made in form and detail without departing from the spirit and scope of the invention.

What is claimed is:

1. A structural apparatus, comprising:
    a passive damping mechanism, including:
        a first element of magnetic material;
        a second element of magnetic material;
        a shaft extending between the first and second elements;
        a piston having an axial bore coaxially positioned with respect to the shaft, the piston and shaft being linearly movable relative to one another upon application of forces to the structural apparatus, the shaft being spaced from the axial bore of the piston by a restrictive fluid flow annulus;
        resilient seal means having a static stiffness, the resilient seal means coupling each of the first and second elements to the piston to define first and second fluid chambers in fluid communication with restrictive fluid flow annulus;
        a viscous fluid filling the first and second chambers and the restrictive fluid flow annulus, the viscous fluid dissipating the forces via shearing of the viscous fluid as the fluid is displaced through the restrictive fluid flow annulus upon relative linear movement of the piston and shaft; and
        magnetic means for generating magnetic forces which interact with the first and second elements to destiffen the static stiffness of the resilient seal means.

2. The structural apparatus of claim 1 wherein the static stiffness of the resilient seal means is a positive stiffness and wherein the magnetic forces generated by the magnetic means exhibit a negative stiffness that cancels a majority of the positive stiffness of the resilient seal means.

3. The structural apparatus of claim 2 wherein the negative stiffness of the magnetic forces cancels substantially 90% of the positive stiffness of the resilient seal means with the remaining positive stiffness allowing stable dissipation of the forces by the passive damping mechanism.

4. The structural apparatus of claim 1 wherein the magnetic means includes:
    a first permanent magnet mounted on the piston proximate to the first element; and
    a second permanent magnet mounted on the piston proximate to the second element.

5. The structural apparatus of claim 4 wherein each of the first and second permanent magnets includes a central bore that is coaxially positioned with respect to the shaft.

6. The structural apparatus of claim 5 wherein each of the first and second permanent magnets is toroidal in shape.

7. The structural apparatus of claim 6 wherein each of the first and second elements includes a protrusion extending towards the piston, the protrusions of the first and second elements being in axial alignment with the first and second permanent magnets, respectively, such that the magnetic forces act on the protrusions to provide radial stiffness to the passive damping mechanism.

8. The structural apparatus of claim 7 wherein each of the protrusions is toroidal in shape and the magnetic forces act to provide a force coaxially centering the axial bore of the piston about the shaft.

9. The structural apparatus of claim 1 wherein the magnetic means includes:
    first and second spaced permanent magnets mounted on the piston proximate to the first element; and
    third and fourth spaced permanent magnets mounted on the piston proximate to the second element.

10. The structural apparatus of claim 9 wherein each of the first, second, third and fourth permanent magnets includes a central bore that is coaxially positioned with respect to the shaft.

11. The structural apparatus of claim 10 wherein each of the first, second, third and fourth permanent magnets is toroidal in shape.

12. The structural apparatus of claim 11 wherein each of the first and second elements includes a pair of spaced protrusions extending towards the piston, the pair of spaced protrusions of the first and second elements being in axial alignment with the first and second, and third and fourth permanent magnets, respectively, such that the magnetic forces act on the protrusions to provide radial stiffness to the passive damping mechanism.

13. The structural apparatus of claim 12 wherein each of the protrusions is toroidal in shape and the magnetic forces act to provide a force coaxially centering the axial bore of the piston about the shaft.

14. The structural apparatus of claim 9, and further including an active enhancement mechanism including:
    auxiliary magnetic means for generating additional magnetic forces which act on the first and second elements to further destiffen the static stiffness of the resilient seal means.

15. The structural apparatus of claim 11 wherein the active enhancement mechanism further includes:
    a sensing mechanism for sensing the axial displacement of the passive damping mechanism, the sensing mechanism being coupled to the auxiliary magnetic means such that the auxiliary magnetic means generates the additional magnetic forces in response to the displacement sensed by the sensing mechanism to further linearize the damping mechanism.

16. The structural apparatus of claim 15 wherein the auxiliary magnetic means includes:
    a first magnetic coil mounted on the piston between the first and second permanent magnets and proximate to the first element;
    a second magnetic coil mounted on the piston between the third and fourth permanent magnets and proximate to the second element; and
    a power source coupled to the first and second magnetic coils and the sensing mechanism, the power source energizing the first and second magnetic coils to generate the additional magnetic forces in response to the forces sensed by the sensing mechanism.

17. The structural apparatus of claim 15 wherein the sensing mechanism is a position sensor.

18. The structural apparatus of claim 15 wherein the sensing mechanism is a flux sensor.

19. The structural apparatus of claim 1 wherein the resilient seal means includes:
    a first resilient fluid seal that couples the first element to a first side of the piston; and
    a second resilient seal that couples the second element to a second side of the piston.

20. The structural apparatus of claim 19 wherein the first and second resilient fluid seals are first and second resilient bellows.

21. The structural apparatus of claim 1 wherein forces are vibration and shock forces and the structural apparatus is a vibration damping and isolation apparatus for dissipating vibration and shock forces.

* * * * *